Figure 1:
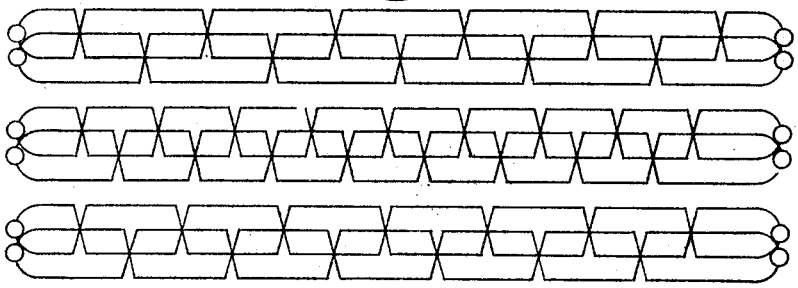
Figure 2:
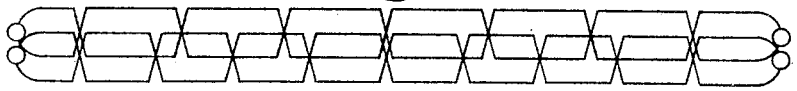

March 3, 1931. O. HAUGWITZ 1,795,209

SIGNALING CABLE

Filed Dec. 31, 1926

Inventor:
Otto Haugwitz
by
His Attorney

Patented Mar. 3, 1931

1,795,209

UNITED STATES PATENT OFFICE

OTTO HAUGWITZ, OF CHARLOTTENBURG, GERMANY, ASSIGNOR TO GENERAL ELECTRIC COMPANY, A CORPORATION OF NEW YORK

SIGNALING CABLE

Application filed December 31, 1926, Serial No. 158,341, and in Germany January 29, 1926.

My present invention relates to cable for signaling and communication purposes, and more particularly to cables made up of a large number of conductors, and which are especially intended for long distance work.

The object of my invention is to provide a cable and a method of constructing the same wherein the diameter of the cable and hence the cost of its construction for a given number of conductors may be appreciably reduced in comparison with the forms of construction previously used.

Long distance signaling cables are, as is well known, built up, according to the purpose in view, of single conductors, pairs, quadruple arrangements or of groups of still higher order. The single conductor arrangement is used for telegraph and signaling purposes. For telephone operation double lines are required and in this case it is necessary to make provision for avoiding mutual effects of the individual talking circuits. If, in a cable stranded from single conductors, two adjacent conductors of one layer are used for a double line and the two following ones also, a close coupling exists between the two talking circuits, since one conductor of the one talking circuit is located directly adjacent a conductor of the other and thus the capacity between these two conductors is very great. The two externally located conductors cannot compensate this coupling since their mutual capacity is negligible. The conductor cable is, therefore, not immediately capable of being used for double line operation. The mutual coupling of the adjacent talking circuits has been avoided by twisting the conductors belonging to a double line with one another into a pair, the neighbouring pairs being given different twist. The object, to avoid the coupling, was achieved, but at the cost of an increase of the cable diameter. A comparison, for example, between a 102 conductor cable and a 51 pair cable shows that the conductor cable has a core diameter of 12.0 conductor diameters, the pair cable one of 8.45 pair diameters, or, since the pair diameter amounts to about 1.7 times the conductor diameter, 14.4 conductor diameters. The increase of diameter compared with the conductor stranding amounts therefore to about 20 per cent.

In the stranding of conductors to star quadruple arrangements this increase of diameter is almost compensated again, since, on account of the lower capacity in principle in the case of the star quadruple arrangement, thinner conductors can be employed.

A more specific object of my invention is to provide a cable, particularly for double line and phantom operation, which is built up in a novel way and thereby permits a considerably more advantageous utilization of space or allows a considerable reduction of diameter with the same electric properties compared with the known systems. The cable is composed of layers, whose conductors are stranded in parallel, two conductors of one layer always belonging to a double line. It is advantageous to take two conductors for a double line which are located in the layer in such a way that they always have at least one conductor of another line between them. The mutual coupling in principle of the circuits is removed by transposing the conductors belonging to a double line at predetermined distances apart. If two of these are united into a phantom line, the pairs as well as the conductors must be transposed at predetermined distances apart. In this way also the present invention differs from older methods, in which also conductor cables were made free from induction by transpositions. The transposition sections of the adjacent lines are to be selected differently.

Figure 4:
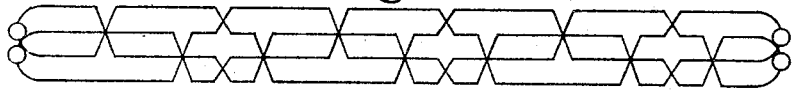
Figure 5:
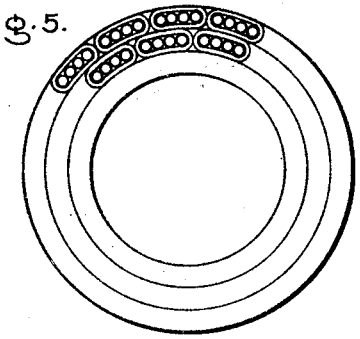
Figure 6:
Figure 7:

The novel features which I believe to be characteristic of my invention are set forth with particularity in the appended claim. My invention itself, however, both as to its organization and method of operation will best be understood by reference to the following description taken in connection with the accompanying drawing in which Figs. 1, 2, 3 and 4 show diagrammatically different conductor arrangements which may be used in the cable; Fig. 5 is a cross-sectional view of a portion of a cable constructed in accordance with my invention; and Figs. 6 and 7 are detailed cross-sectional views showing modifications in the manner of holding groups of conductors in their desired position in the cable.

In Fig. 1 such a layer consisting of twelve conductors is represented developed diagrammatically, and in this case only the pairs are transposed. As can be seen, there arise in the arrangement, in which always one conductor of another line is located between the conductors of a double line, groups or transposition units which consist of four adjacent conductors. The transposition within these quadruple groups can, for example, be effected in the manner that for the first trunk another transposition section is selected than for the second, so that the transposition points are displaced with reference to one another (Fig. 2) or, since for both double lines the same sections are selected, the transposition points of the one falling exactly in the center of the transposition sections of the other. This system is to be seen in Fig. 1. With sufficiently great spacing from one another pairs may also run through without crossing. The transposition of the pairs in quadruple circuits is effected in the same manner as those of the conductors.

Figure 3:

Fig. 3 shows the transposition diagram of a quadruple arrangement, which is formed from two pairs located adjacent one another; Fig. 4 that of a quadruple arrangement which is formed of two pairs located within one another. The possible remaining couplings depend upon the length of the transposition sections, they are in appropriate manner selected so short that, on cutting the cable at any desired point, the uncompensated transposition sections produce no dangerous couplings.

Such a cable is manufactured in very simple manner by stranding the conductors in ordinary manner into layers, the conductors belonging to a double line being transposed shortly in front of the nipple through which the cable runs when stranding. The transposing device for each pair can, for example, consist of a disc with two holes, through which the conductors run, and which can be turned to and fro through 180°. The groups may also be manufactured, for example, of four conductors as straight bands without twist, wound on drums and the bands then stranded into a cable.

Fig. 5 shows such a cable in cross-section. The manufacture of quadruple bands may, for example, be effected by letting the conductors run simultaneously through a flat nipple and thereupon winding them round with a thread or paper band. In this case it is desirable to allow a paper strip $a$ to run in also, either on one side (Fig. 6) or on both sides (Fig. 7), in order to prevent the conductors from shifting out of their position. In order to hold the conductors firmly in their position they can also be interlaced with a thread. The transposition is effected in front of the nipple.

It is of course possible to prepare bands also of only two conductors, but such double lines have, since their conductors are located directly adjacent one another, in principle a higher capacity than those in which the conductors lie separated, as in the quadruple bands, and require, therefore, with the same capacity a greater conductor diameter and, therefore, cable diameter, whereby the advantage is partly lost again.

Also it is possible to manufacture bands of more than four conductors, but then the difficulties of manufacture increase, since the building up of the cable from the broad bands cannot be carried out in such a simple manner.

It is possible in the building up of the cable, according to the number of pairs required, to use the one or the other principle, or to build up the cable mixed. Thus it is possible, since the core of the cable cannot be readily manufactured from bands, to strand it, for example, of star quadruple lines, normal pairs or pair bands, and after that only to begin with the stranding of the quadruple bands. The layers must be stranded with opposite twist.

The advantages of the new manner of stranding consists in the very simple manner of manufacture, which is occasioned by the omission of the twisting machines, and in the saving of space in the cable cross-section. The diameter is, when using two conductors, located adjacent one another approximately the same as that of a conductor cable, therefore already considerably less than in the case of stranding in pairs. When using two conductors, which are not located directly adjacent, but have between them conductors of another line, the cable diameter with the same electric properties is again smaller in the same ratio as the diameter of the individual conductors can be smaller, on account of the operating capacity being smaller in principle through absence of the direct capacity between the two conductors belonging to the double line.

By the term "stranded in parallel" which I have frequently used in this specification it will be understood that I mean that the conductors are arranged, except at points of transposition, in substantially parallel relation with respect to each other.

What I claim as new and desire to secure by Letters Patent of the United States is:—

A signaling cable comprising a plurality of layers, each layer being made up of a group of conductors bound together in the form of a band, the conductors forming each band being bound together and each band being provided with a layer of stiffening material extending lengthwise of the band upon at least one side of the conductors and within the binding.

In witness whereof, I have hereunto set my hand this third day of December, 1926.

OTTO HAUGWITZ.